(12) United States Patent
Cherigui et al.

(10) Patent No.: US 9,299,002 B2
(45) Date of Patent: Mar. 29, 2016

(54) METHOD FOR EXTRACTING AN EPITOME FROM AN IMAGE

(75) Inventors: Safa Cherigui, Villeurbannes (FR); Dominique Thoreau, Cesson Sevigne (FR); Edouard Francois, Cesson Sevigne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 91 days.

(21) Appl. No.: 13/980,882

(22) PCT Filed: Dec. 12, 2011

(86) PCT No.: PCT/EP2011/072431
§ 371 (c)(1),
(2), (4) Date: Oct. 1, 2013

(87) PCT Pub. No.: WO2012/097919
PCT Pub. Date: Jul. 26, 2012

(65) Prior Publication Data
US 2014/0044363 A1    Feb. 13, 2014

(30) Foreign Application Priority Data

Jan. 21, 2011   (EP) .................................... 11305065

(51) Int. Cl.
*G06K 9/46* (2006.01)
*H04N 19/147* (2014.01)
(Continued)

(52) U.S. Cl.
CPC ............ *G06K 9/4642* (2013.01); *H04N 19/147* (2014.11); *H04N 19/19* (2014.11); *H04N 19/99* (2014.11)

(58) Field of Classification Search
CPC ..... G06K 9/4642; G06K 9/46; H04N 19/147; H04N 19/99; H04N 119/593; H04N 119/91; H04N 119/36; H04N 7/34; H04N 19/61; H04N 19/00781; H04N 19/649

USPC ......... 382/205, 278, 190, 276, 173, 159, 195; 375/240.12, 240.16, E7.104, 240.22, 375/240.26; 345/582; 704/258, 243, 245, 704/250
See application file for complete search history.

(56) References Cited

U.S. PATENT DOCUMENTS 7,729,531 B2    6/2010  Winn et al.
7,978,906 B2 *  7/2011  Jojic et al. .................. 382/159
(Continued)

FOREIGN PATENT DOCUMENTS

WO    WO2009102562    8/2009

OTHER PUBLICATIONS

Safa Cheriguri etal: "Epitome-based image compression using tranlsational sub-pel mapping", Multimedia Signal Processing (MMSP), 2011 IEEE 13th International Workshop on, IEEE, Oct. 17, 2011, pp. 1-6, XP032027526, DOI: 10.1109/MMSP.2011.6093786, ISBN:978-1-4577-1432-0.

(Continued)

*Primary Examiner* — Sheela Chawan
(74) *Attorney, Agent, or Firm* — Tutunjian & Bitetto, P.C.

(57) ABSTRACT

A method for extracting an epitome from an image Y is described. The method comprises:
  searching, for each block, a list of patches in the image Y with similar content;
  determining, for each patch of said lists, the set of blocks able to be represented by the patch;
  constructing, from the sets of blocks, epitome charts comprising, for each epitome chart, initializing said epitome chart with one patch and extending said epitome chart with at least one candidate region contained in a patch overlapping said epitome chart;
  said method being characterized in that said candidate region is selected by taking into account the blocks represented by said patch overlapping said epitome chart and by any other patch contained in said epitome chart enlarged by said selected candidate region.

10 Claims, 7 Drawing Sheets

(51) Int. Cl.
H04N 19/19 (2014.01)
H04N 19/90 (2014.01)

(56) References Cited

U.S. PATENT DOCUMENTS

2009/0208110 A1* 8/2009 Hoppe et al. .................. 382/190
2009/0244083 A1 10/2009 Wei et al.

OTHER PUBLICATIONS

Wang H et al: "Factoring repeated content within and among images", ACM SIGGRAPH 2008 Papers (Siggraph '08, Los Angeles), New York, NY, USA, Aug. 11, 2008, pp. 1-10, XP002636385, paragraph [0004].
Search Report Dated Mar. 15, 2012.
Cheung et al., "Video epitomes", Proceedings 2005 IEEE computer society conference on computer vision and pattern recognition, San Diego, California, USA, Jun. 20, 2005, pp. 1-8.
Chu et al., "Spatialized epitome and its applications", 2010 IEEE conference on computer vision and pattern recognition (CVPR), Colorado Springs, Colorado, USA, Jun. 21, 2010, pp. 311-318.
Sun et al., "A low cost video coding scheme using texture synthesis", Proceedings of the 2009 2nd international congress on image and signal processing (CISP), Tianjin, China, Oct. 17, 2009, pp. 1-5.
Wang et al., "Intra coding and refresh based on video epitomic analysis", IEEE international conference on multimedia and expo (ICME), Singapore, Malaysia, Jul. 19, 2010, pp. 452-455.
Jojic et al., "Epitomic analysis of appearance and shape", Proceedings Ninth IEEE International Conference on Computer Vision, Nice, France, Oct. 14, 2003, pp. 1-10.
Wiegand et al., "Overview of the H.264 AVC Video Coding Standard", IEEE Transactions on circuits and systems for video technology, vol. 13, No. 7, Jul. 2003, pp. 560-576.
Aharon et al., "Sparse and Redundant Modeling of Image Content Using an Image-Signature-Dictionary", SIAM Journal of Imaging Sciences, vol. 1, No. 3, Jul. 2008, pp. 228-247.
Tan et al., "Intra Prediction by Template Matching", International Conference on Image Processing, Atlanta, Georgia, USA, Oct. 8, 2006, pp. 1693-1696.
Simakov et al., "Summarizing Visual Data Using Bidirectional Similarity", Computer Vision and Pattern Recognition, CVPR 2008, Anchorage, Alaska, USA, Jun. 24, 2008, pp. 1-8.
Wei et al., "Inverse Texture Synthesis", ACM Transactions on Graphics, vol. 27, No. 3, Aug. 2008, pp. 1-10.
Suhring, "KTA Software", Heinrich-Hertz-Institut JM reference software version 11.0, http://iphome.hhi.de/suehring/tml/download/KTA/, Jan. 6, 2011, pp. 1.
Bjontegaard, "Calculation of average PSNR differences between RD-curves", ITU—Telecommunications Standardization Sector, Video Coding Experts Group, Thirteenth Meeting, Austin, Texas, USA, Apr. 2, 2001, pp. 1-4.
Martin et al., "Sparse representation for Image Prediction", Proceedings of European signal processing conference (EUSIPCO), Poznan, Poland, Sep. 3, 2007, pp. 1255-1259.
Turkan et al., "Image prediction template matching vs sparse approximation", International Conference on Image Processing, Hong Kong, China, Sep. 26, 2010, pp. 789-792.
Wang et al., "Improving intra coding in H264\AVC by image epitome", Pacific Rim Conference on Multimedia, Bangkok, Thailand, Dec. 15, 2009, pp. 190-200.

* cited by examiner

METHOD FOR EXTRACTING AN EPITOME FROM AN IMAGE

This application claims the benefit, under 35 U.S.C. §365 of International Application PCT/EP2011/072431, filed Dec. 12, 2011, which was published in accordance with PCT Article 21(2) on Jul. 26, 2012 in English and which claims the benefit of European patent application No. 11305065.2, filed Jan. 21, 2011.

FIELD OF THE INVENTION

The invention relates to image epitome extraction.

BACKGROUND OF THE INVENTION

An epitome of an image is its condensed representation containing the essence of the textural and structure properties of the image. The epitome approach aims at reducing redundant information (texture) in the image by exploiting repeated content within an image.

Figure 1:
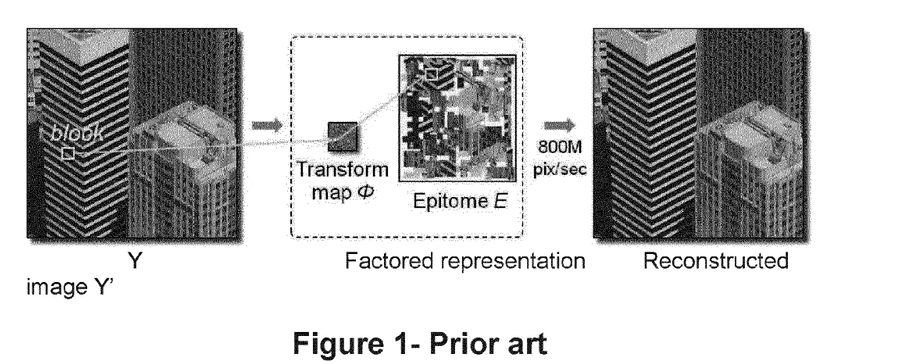
FIG. 1 illustrates the extraction of an epitome from an image Y and the reconstruction of an image Y' from a texture epitome E and a transform map $\phi$ according to the prior art.

It is known to factor an image into a texture epitome E and a transform map $\phi$. The epitome principle was first disclosed by Hoppe et al in the article entitled "*Factoring Repeated Content Within and Among Images*" published in the proceedings of ACM SIGGRAPH 2008 (ACM Transaction on Graphics, vol. 27, no. 3, pp. 1-10, 2008). FIG. 1 illustrates the method of Hoppe. From an image Y, a texture epitome E and a transform map $\phi$ are created such that all image blocks of Y can be reconstructed from matched epitome patches of E. A matched patch is also known as transformed patch. Once the self similarity content is determined in image Y, the method of Hoppe extracts redundant texture patches to construct epitome charts, the union of all epitome charts constituting the texture epitome E. Each epitome chart represents repeated regions in the image. The construction of an epitome chart is composed of a chart initialization step followed by several chart extension steps. The transform map $\phi$ is an assignation map that keeps track of the correspondences between each block of the current image Icurr and a texture patch of the texture epitome E. The transform map is also known as vector map or assignment map in the literature. With the texture epitome E and the transform map $\phi$, one is able to reconstruct the image I'. In the following the epitome designates both the texture epitome E and the transform map $\phi$.

BRIEF SUMMARY OF THE INVENTION

The invention is aimed at alleviating at least one of the drawbacks of the prior art. More precisely, the present invention aims at optimizing the way of extending an epitome chart using the notion so-called inferred blocks.

To this aim, the invention relates to a method for extracting an epitome from an image Y divided into blocks with a view to reconstruct the image from the extracted epitome. The method comprises the step of:
 searching, for each block, a set of patches in the image Y with similar content;
 determining, for each patch of the sets, the set of blocks able to be represented by the patch;
 constructing, from the sets of blocks, epitome charts comprising, for each epitome chart, initializing the epitome chart with one patch and extending the epitome chart with at least one region $\Delta E$ contained in a patch overlapping the epitome chart.
Advantageously, the region is selected by taking into account the blocks represented by the patch overlapping the epitome chart and by any other patch contained in the epitome chart enlarged by the selected region.

According to a specific aspect of the invention, the epitome chart is initialized with one patch of the lists which is the most representative of the not yet represented blocks.

According to another aspect of the invention, extending the epitome chart comprises:
b) determining a set of candidate regions for extension of the epitome chart from patches overlapping the epitome chart and representing blocks not represented by the epitome chart;
c) selecting one region $\Delta E$ of the set of candidate regions by taking into account the blocks represented by the patch containing the candidate region and by any other patch contained in the epitome chart enlarged by the selected candidate region;
d) add the selected candidate region to the epitome chart;
e) repeat steps b) to d) until no more patches overlap the epitome chart.

According to another aspect of the invention, selecting one candidate region of the set of candidate regions comprises determining the candidate region $\Delta E$ of the set of candidate regions minimizing the following function:

$$\left( \frac{\sum_{i}^{N} \sum_{j}^{M} (Y_{i,j} - Y'_{i,j})}{N*M} + \lambda * \left( \frac{E_{curr} + \Delta E}{N*M} \right) \right)$$

where N is the height of the image Y and M is the width of the image;
$Y_{i,j}$ are the values of the pixels of the image Y;
$Y'_{i,j}$ are the values of the pixels of an image Y' reconstructed from the epitome charts and the candidate region $\Delta E$, the pixel value of the blocks not reconstructed being set to zero; and
$\lambda$ is a parameter.

According to a specific embodiment, $\lambda$ is equal to 1000.

The invention further relates to a device for extracting an epitome from an image Y divided into blocks with a view to reconstruct the image from the extracted epitome. The device comprises:
 means for searching, for each block, a set of patches in the image Y with similar content;
 means for determining, for each patch of the sets, the set of blocks able to be represented by the patch;
 means for constructing, from the sets of blocks, epitome charts comprising means for initializing the epitome chart with one patch and means for extending the epitome chart with at least one region contained in a patch overlapping the epitome chart;
the device being characterized in that means for extending the epitome chart select the region by taking into account the blocks represented by the patch overlapping the epitome chart and by any other patch contained in the epitome chart enlarged by the selected region.

BRIEF DESCRIPTION OF THE DRAWINGS

Other characteristics and advantages of the invention will appear through the description of a non-limiting embodiment of the invention, which will be illustrated, with the help of the enclosed drawing.

DETAILED DESCRIPTION OF THE INVENTION

All examples and conditional language recited herein are intended for pedagogical purposes to aid the read in understanding the principles of the invention and the concepts contributed by the inventor to furthering the art and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

Figure 2:
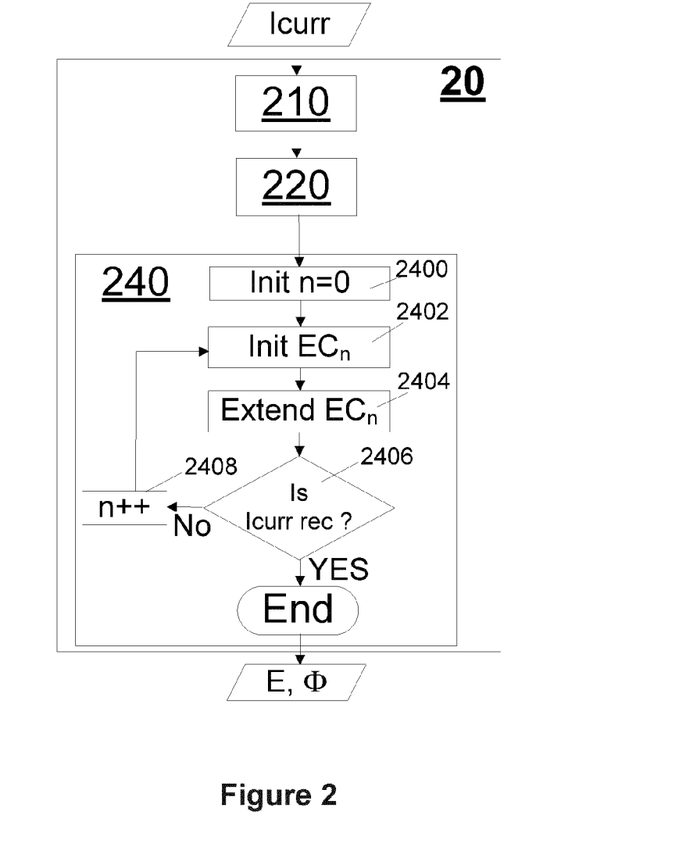
FIG. 2 represents a flowchart of the method of epitome extraction according to the invention.

It is to be further understood that, because some of the constituent system components and method steps depicted in the accompanying Figures are preferably implemented in software, the actual connections between the system components (or the process steps) may differ depending upon the manner in which the present principles is programmed. Given the teachings herein, one of ordinary skill in the related art will be able to contemplate these and similar implementations or configurations of the present principles. FIG. 2 represents a flowchart of the method of extraction of an epitome from a current image Icurr according to the invention. The current image Icurr is factorized, i.e. a texture epitome E and a transform map $\phi$ are created for the current image. The texture epitome E is constructed from pieces of texture (e.g. a set of charts) taken from the current image.

Figure 3:
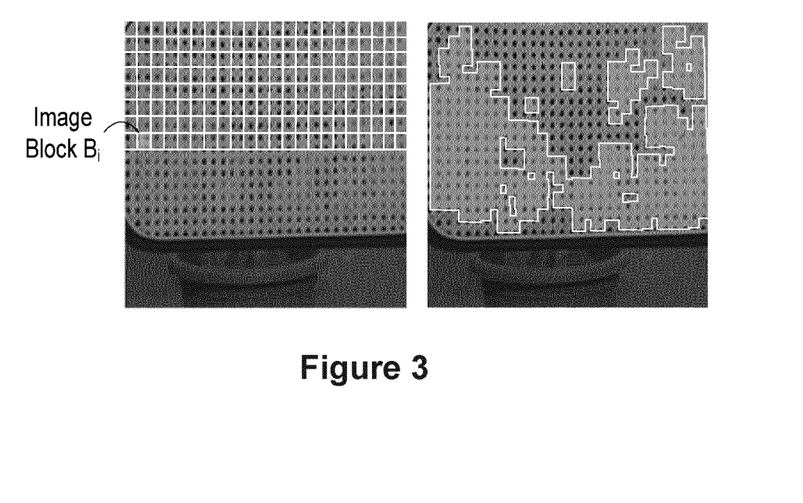
FIG. 3 represents a given image block $B_i$ to be match with the set of matched patches delimited by the white line on the right image with an error tolerance $\epsilon$.

At step 210, the epitome extraction method comprises finding self-similarities within the current image Y. The current image is thus divided into a regular grid of blocks. For each block in the current image Y, one searches the set of patches in the same image with similar content. That is, for each block $B_i$($\in$ block grid), a list $L_{match}(B_i) = \{M_{i,0}, M_{i,1}, \ldots\}$ of matches (or matched patches) is determined that approximate $B_1$ with a given error tolerance $\epsilon$. In the current embodiment, the procedure of matching is performed with a block matching algorithm using an average Euclidian distance. Therefore, at step 210, the patches $M_{j,l}$ in the current image whose distance to the block Bi is below $\epsilon$ are added to the list $L_{match}(B_i)$. The distance equals for example the absolute value of the pixel by pixel difference between the block Bi and the patch $M_{j,l}$ divided by the number of pixels in $B_i$. According to a variant, the distance equals the SSE (Sum of Square Errors), wherein the errors are the pixel by pixel difference between the block Bi and the patch $M_{j,l}$. An exhaustive search is performed in the entire image, i.e. all the patches comprises in the image are tested. According to a variant only a subset of the patches are tested, e.g. one out of two. Once all the match lists have been created for the set of image blocks, new lists $L'_{match}(M_{j,l})$ indicating the set of image blocks that could be represented, i.e. able to be reconstructed, by a patch $M_{j,l}$, are built at step 220. The new lists $L'_{match}(M_{j,l})$ are built for example by reversing the lists $L_{match}(B_i)$. Note that all the patch $M_{j,l}$ found during the full search step are not necessarily aligned with the block grid of the image and thus belong to the "pixel grid" as depicted on FIG. 3. In addition, one block $B_i$ can be in two different lists $L'_{match}(M_{j,l})$.

At step 240, epitome charts are constructed. To this aim, texture patches are extracted, more precisely selected, in order to construct epitome charts, the union of all the epitome charts constituting the texture epitome E. Each epitome chart represents specific regions of the image in term of texture. Step 240 is detailed below.

At step 2400, an index n is set equal to 0, n is an integer.

At step 2402, a first epitome chart $EC_n$ is initialized. Several candidate matched patches can be used to initialize the epitome chart $EC_n$. Each epitome chart is initialized by the matched patch E0 which is the most representative of the not yet reconstructed, i.e. represented, remaining blocks. Let $Y \in R^{N \times M}$ denote the input image and let $Y' \in R^{N \times M}$ denote the image reconstructed by a candidate matched patch and the epitome charts previously constructed. To initialize a chart, the following selection criterion based on the minimization of the Mean Square Error (MSE) criterion is used:

$$FC_{init} = \min\left(\frac{\sum_{i=1}^{N}\sum_{j=1}^{M}(Y_{i,j} - Y'_{i,j})}{N \times M}\right) \quad (1)$$

where $Y_{i,j}$ is the image value of pixel (i,j) in the image Y and $Y'_{i,j}$ is the image value of pixel (i,j) in the reconstructed image Y'.

Figure 4:
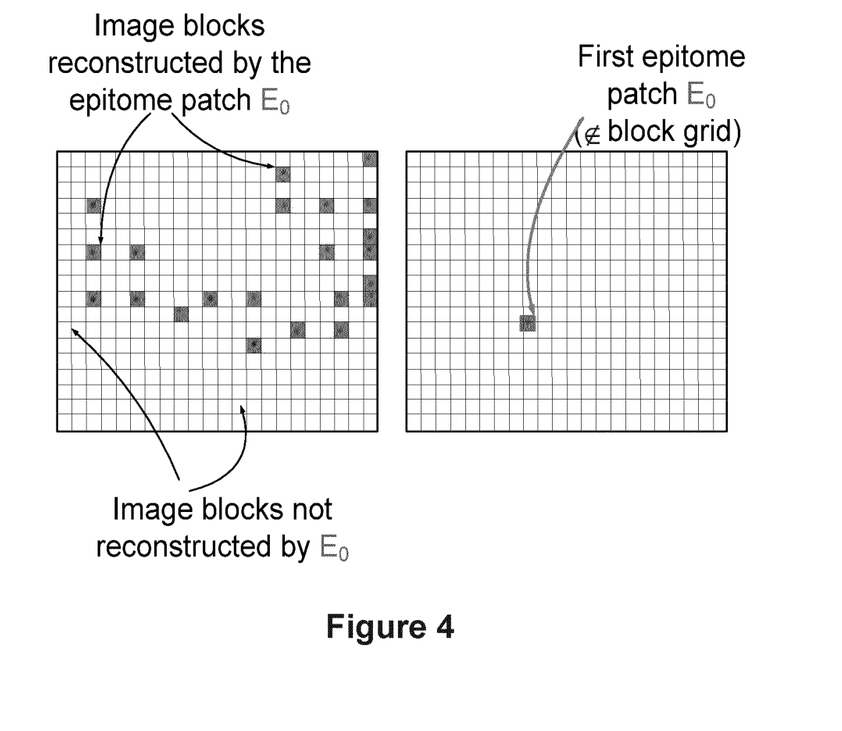
FIG. 4 represents a chart initialization step: on the left, grey blocks in the image are the blocks able to be reconstructed by the current chart, the current epitome $EC_n$ being initially represented by a single patch $E_0$.

The selected criterion takes into account the prediction errors on the whole image. This criterion allows the epitome to be extended by a texture pattern that allows the reconstruction of the largest number of blocks while minimizing the reconstruction error. The reconstruction error is the computed between the input image Y and the image Y' reconstructed from the current epitome. The current epitome comprises a candidate matched patch and the epitome charts previously constructed. In the current embodiment, a zero value is assigned to image pixels of blocks in the image Y' that have not yet been predicted, i.e. represented, by epitome patches when computing the image reconstruction error. According to a variant a value different from zero is used. As an example, the value 128 is used instead of zero. FIG. 4 shows the image blocks reconstructed once the first epitome patch E0 is selected.

Figure 5:
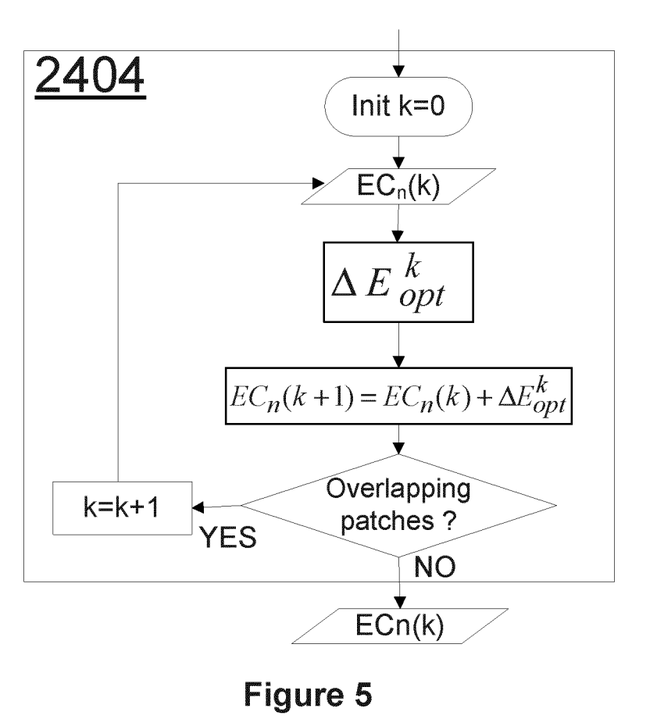
FIG. 5 represents a detail of the flowchart depicted on FIG. 2.
Figure 6:
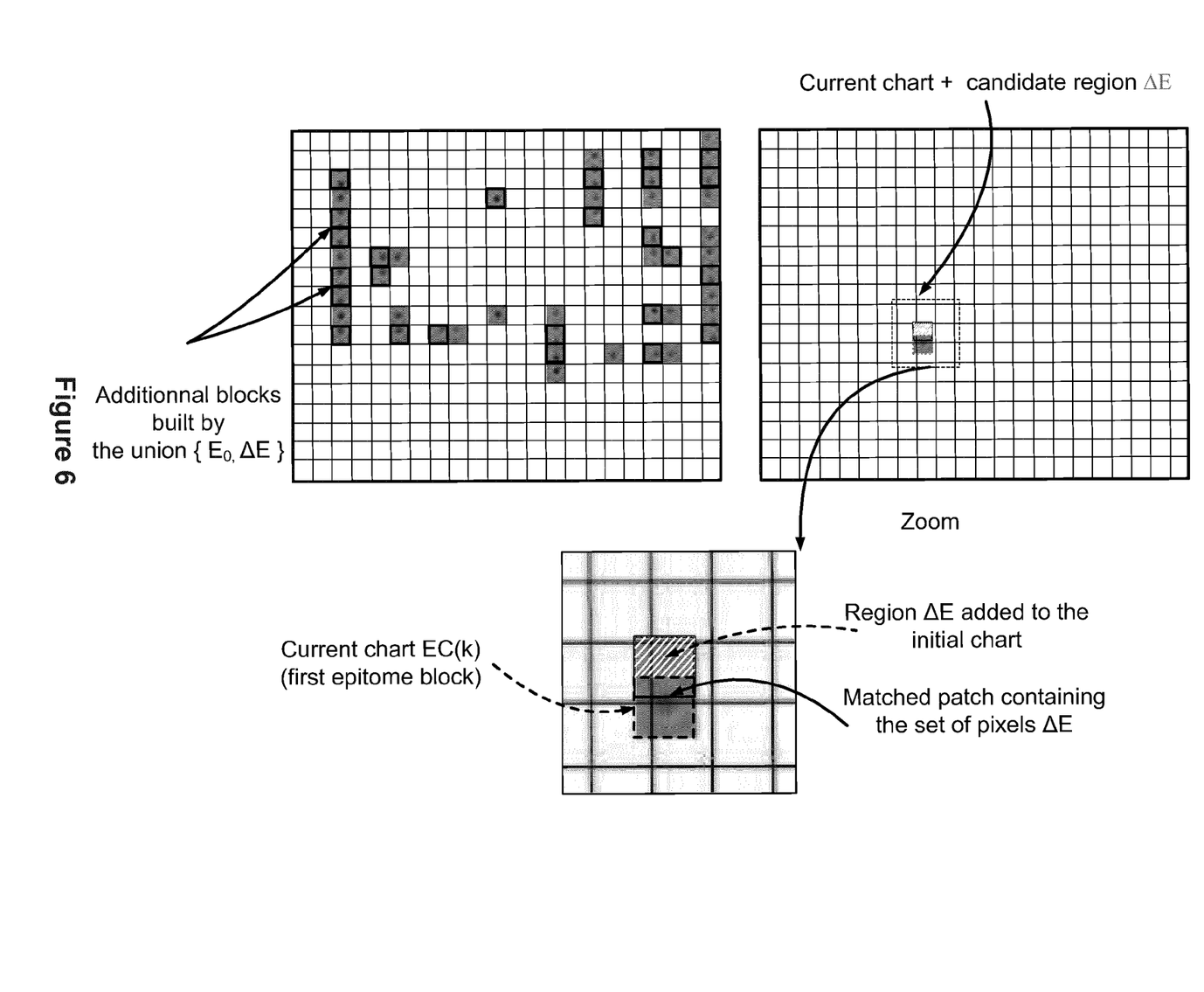
FIG. 6 illustrates an extension chart step: image blocks reconstructed by the current epitome (left) and the current epitome (right) extended by an increment $\Delta E$.

At step 2404, the epitome chart $EC_n$ is then progressively grown by a region from the input image Y. The step is detailed on FIG. 5. Each time the epitome chart is enlarged, one keeps track of the number of additional blocks which can be reconstructed in the image as depicted on FIG. 6. This step is also known as epitome chart extension. The initial epitome chart $EC_n(0)$ corresponds to the texture patch retained at the initialization step 2402. The epitome growth step proceeds first by determining the set of matched patches $M_{j,l}$ that overlap the current chart $EC_n(k)$ and represent other image blocks, i.e. other image block which are not yet represented by the current chart $EC_n(k)$, k being an integer. Therefore, there are several candidates regions $\Delta E$ that can be used as an extension of the current epitome chart. For each chart growth candidate $\Delta E$, the supplement image blocks that could be reconstructed is determined from the list $L'_{match}(M_{j,k})$ related to the matched patch $M_{j,k}$ containing the set of pixels $\Delta E$ and also the additional image blocks predicted, i.e. able to be reconstructed, by "inferred blocks" also called "inferred patches", that are indirectly implied when the chart is extend by the chart growth candidate $\Delta E$. Then, the optimal candidate $\Delta E_{opt}$ leading to best match according to a rate distorsion criterion is selected among the set of the candidate chart growth found. Let $Y \in R^{N \times M}$ denote the input image and let $Y' \in R^{N \times M}$ denote the image reconstructed by the current epitome $E_{curr}$ and a chart growth candidate $\Delta E$. Note that the current epitome $E_{curr}$ is composed of previously constructed epitome charts and the current epitome chart $EC_n(k)$. This selection is indeed conducted according to a minimization of a lagrangian criterion $FC_{ext}$ $$FC_{ext} = \min(D_{E_{curr}+\Delta E} + \lambda * R_{E_{curr}+\Delta E}) \text{ with } E_{curr} = \sum_{i=0}^{n} EC_i$$

$$\Delta E_{opt}^k = \arg\min_{\Delta E}\left(\frac{\sum_{i}^{N}\sum_{j}^{M}(Y_{i,j} - Y'_{i,j})}{N * M} + \lambda * \left(\frac{E_{curr} + \Delta E}{N * M}\right)\right)$$

Figure 7:
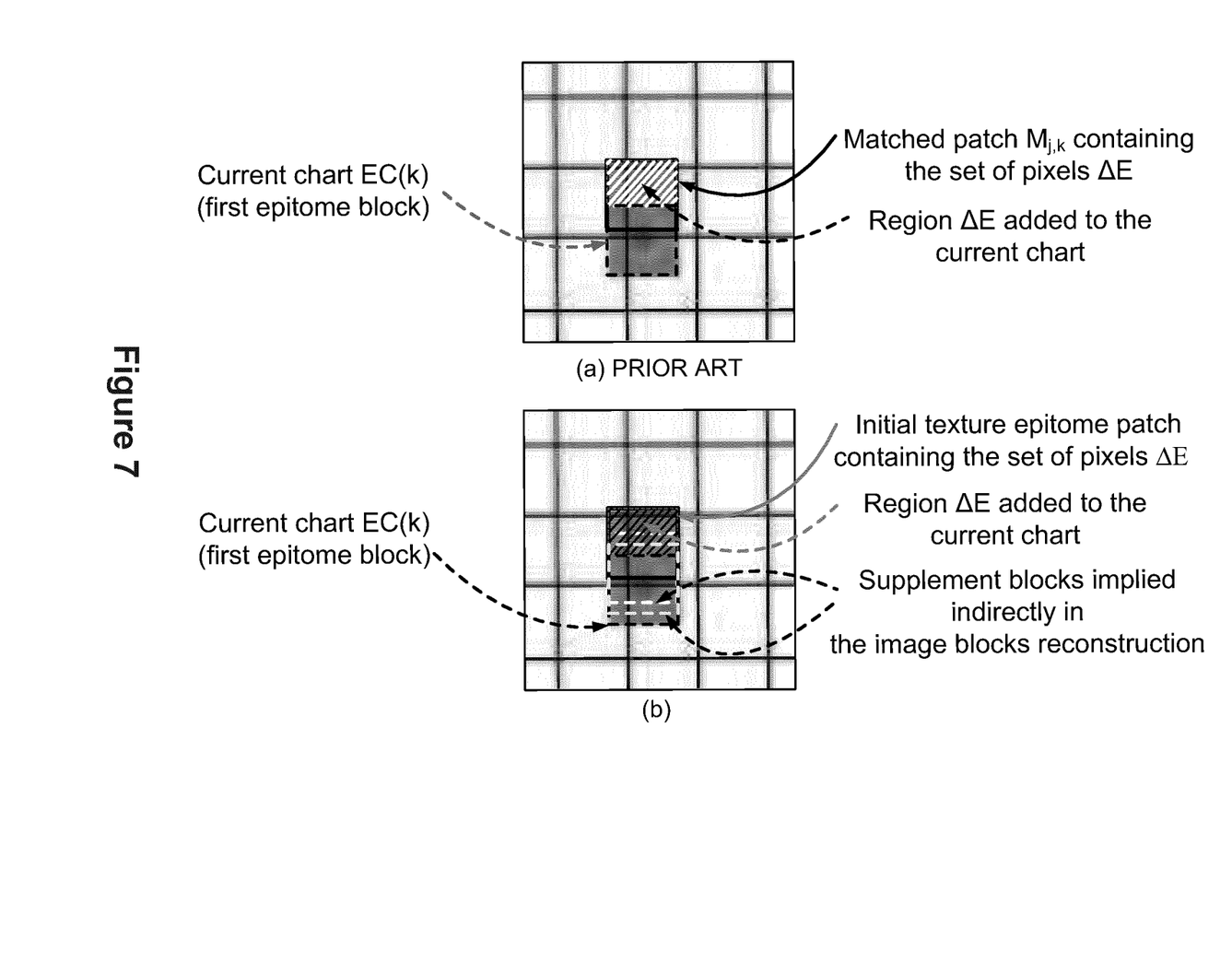
FIG. 7 illustrates the extension chart step: epitome chart extension according to the prior art (a), epitome chart extension according to the invention (b)

In the preferred embodiment, the $\lambda$ value is set to 1000. The first term of the criterion refers to the average prediction error per pixel when the input image is reconstructed by texture information contained in the current epitome $$E_{curr} = \sum_{i=0}^{n} EC_i$$

and the increment $\Delta E$. As in the initialization step when the image pixels are impacted neither by the current epitome $E_{curr}$ nor by the increment nor by the inferred blocks (i.e. does not belong to a block that can be reconstructed from $E_{curr}$, from the match patch that contains the increment or from the inferred blocks), a zero value is assigned to them. According to a variant a value different from zero is used. As an example, the value 128 is used instead of zero. $FC_{ext}$ is thus computed on the whole image and not only on the reconstructed image blocks. So far, in order to do this, one merely considers the impact of the matched patch $M_{j,k}$ that contains the set of pixels $\Delta E$, in the reconstruction of image blocks (FIG. 7a). Indeed, only the image blocks reconstructed by the initial texture epitome patch $M_{j,k}$ are processed.

Figure 8:
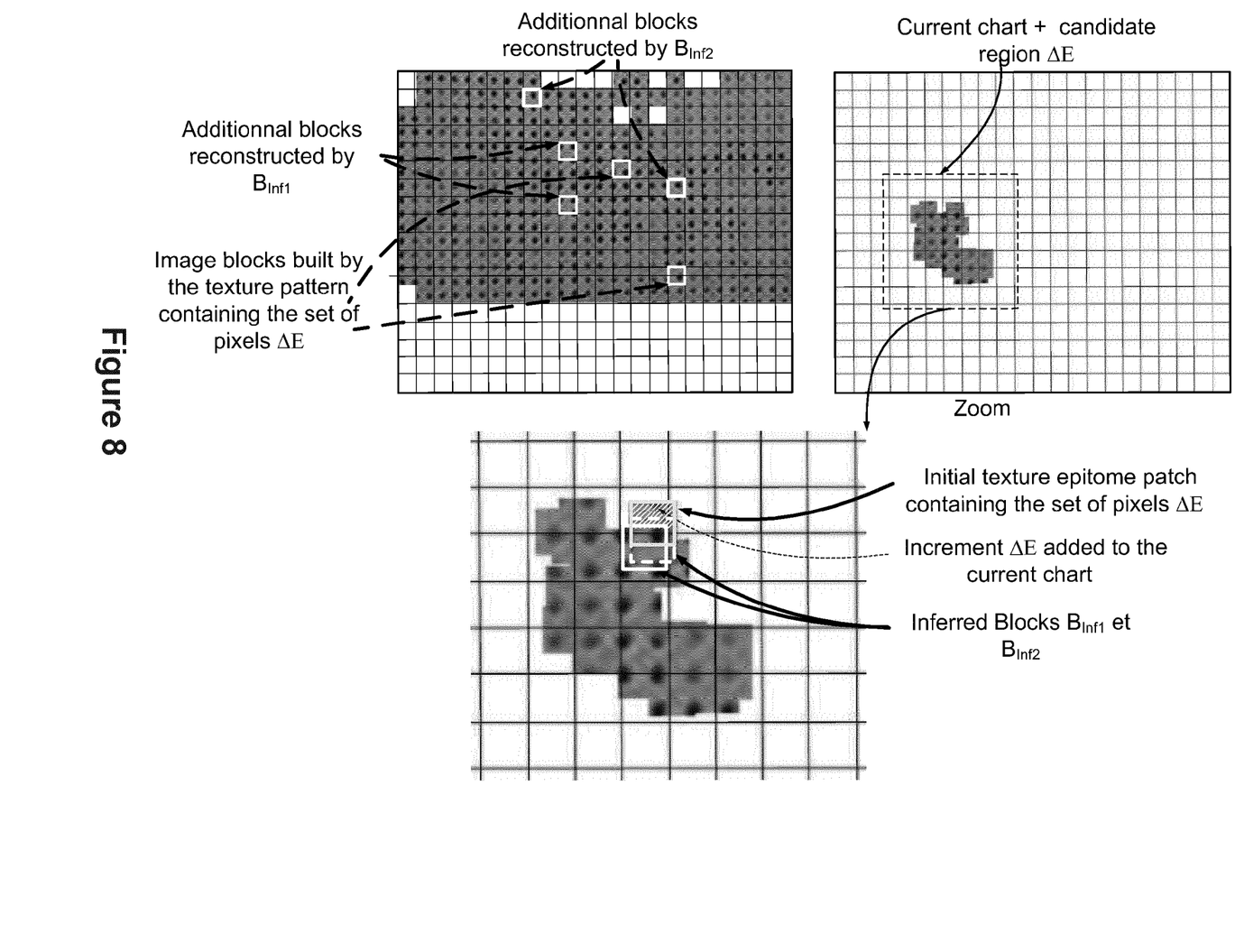
FIG. 8 illustrates the consideration of inferred blocks while extending a chart: the image blocks reconstructed by the current chart (top left), the current chart growing by an increment (top right)

FIG. 8 illustrates more precisely the principle of inferred blocks according to the invention after several extension chart steps. The proposed extension method consists thus in taking into account not only the matched patch that contains the set of pixels $\Delta E$ but also the blocks (in the sense of a match patch)

which are implied indirectly when an increment ΔE is added to the current chart. Indeed, while extending the current epitome chart, one looks in addition whether the current chart and a given candidate increment ΔE can provide other epitome patches that allow representing additional image blocks as depicted on FIG. 7b. Note that the so-called inferred blocks do not imply adding texture content other than ΔE in the current epitome. Moreover, these inferred blocks, blocks Binf1 and Binf2 on FIG. 8, contain only a part of the increment ΔE. We can notice in particular that the number of inferred blocks is much more important when we construct an epitome with sub-pel accuracy. In addition, the number of inferred blocks also depends on the local spatial repartition of the pixels available in the current epitome.

The second term of the criterion corresponds to a rate per pixel when constructing the epitome, which is roughly estimated as the number of pixels in the current epitome and its increment, divided by the total number of pixels in the image. After having selected the locally optimal increment $\Delta E_{opt}$, the current epitome chart becomes: $EC_n(k+1)=EC_n(k)+\Delta E_{opt}$. The assignation map is updated for the blocks newly reconstructed by $EC_n(k+1)$. Then, the current chart is extended, during next iteration k+1, until there are no more matched patches $M_{j,i}$, which overlap the current chart $EC_n(k)$ and represent others blocks. If such overlapping patches exist then the method continues at step 2404 with $EC_n(k+1)$. When the current chart cannot be extended anymore and when the whole image is not yet reconstructed by the current epitome (step 2406), the index n is incremented by 1 at step 2408 and another epitome chart is created at a new location in the image. The method thus continues with the new epitome chart at step 2402, i.e. the new chart is first initialized before its extension. The process ends when the whole image is reconstructed by the epitome (step 2406). The texture epitome E comprises the union of all epitome charts $EC_n$. The assignation map indicates for each block Bi of the current image the location in the texture epitome of the patch used for its reconstruction.

Figure 9:
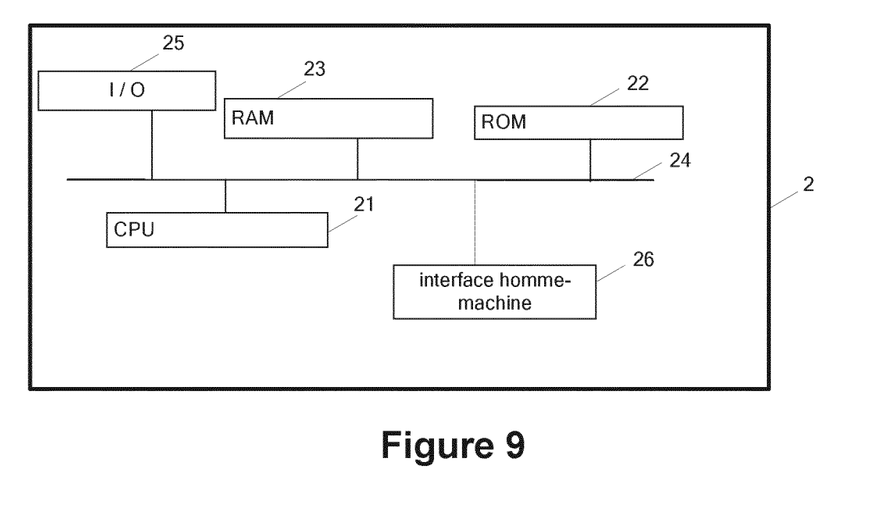
FIG. 9 represents an epitome extractor.

FIG. 9 diagrammatically illustrates an epitome extracting 2 according to the invention. Only the essential elements of the epitome extracting device 2 are shown in FIG. 10. The epitome extracting device 2 comprises, connected together by an address and data bus 24:
  a processing unit 21 such as a microprocessor (or CPU),
  a non-volatile memory of the ROM (Read Only Memory) type 22,
  a Random Access Memory (RAM) 23,
  an input and output interface 25, and
  possibly a man-machine interface 26.

The non-volatile memory 22 contains algorithms implementing the steps 210, 220 and 240 of the method of epitome extraction according to the invention. When powered up, the processing unit 21 loads and runs the instructions of these algorithms. The random access memory 23 comprises notably operating programs of the processor unit 21 that are loaded at the powering up of the device, as well as the images to be processed in order to extract an epitome. The function of the input/output interface 25 is to receive the input signal (i.e. the image or images from whom epitome is extracted) and transmit the epitome extracted according to the steps 210 to 240 of the method of the invention. The man-machine interface 26 can enable the operator to manually input the values of some parameters such as ε. The epitome are stored in the random access memory then possibly transferred to the read-only memory to be archived with a view to subsequent processing operations. The man-machine interface 26 possibly comprises a control panel, for example a keyboard and a display screen.

According to variants, the epitome extraction devices compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

The invention has one advantage which is to improve the rate expressed as the ratio between the input image size and the epitome image size in terms of pixels.

Compared to the epitome construction method according to the state of the art approach, the invention has the advantages to reduce the epitome size in terms of pixels.

The invention finds its interest in all domains concerned with the image epitome reduction. Applications related to video compression and representations of videos are concerned.

The invention claimed is:

1. A method for extracting an epitome from an image Y divided into blocks to reconstruct said image from said extracted epitome comprising:
  utilizing a hardware processor for
    searching, for each block, a set of patches in the image Y with similar content;
    determining, for each patch of said sets, the set of blocks able to be represented by said patch;
    constructing, from said sets of blocks, epitome charts comprising, for each epitome chart, initializing said epitome chart with one patch and extending said epitome chart with at least one region ΔE contained in a patch overlapping said epitome chart;
    wherein said at least one region ΔE is selected by taking into account the blocks represented by said patch overlapping said epitome chart and by any other patch contained in said epitome chart enlarged by said selected region.

2. The method according to claim 1, wherein said epitome chart is initialized with one patch of said lists which is the most representative of the not yet represented blocks.

3. The method according to claim 1, wherein extending the epitome chart comprises:
  determining a set of candidate regions for extension of said epitome chart from patches overlapping said epitome chart and representing blocks not represented by the epitome chart;
  selecting one region ΔE of said set of candidate regions by taking into account the blocks represented by the patch containing said candidate region and by any other patch contained in said epitome chart enlarged by said selected candidate region;
  adding said selected candidate region to said epitome chart;
  repeating said determining a set of candidate regions, selecting one region and adding the selected candidate region to the epitome chart until no more patches overlap said epitome chart.

4. The method according to claim 3, wherein selecting one candidate region of said set of candidate regions comprises determining the candidate region ΔE of said set of candidate regions minimizing the following function:

$$\left( \frac{\sum_{i}^{N} \sum_{j}^{M} (Y_{i,j} - Y'_{i,j})}{N*M} + \lambda * \left( \frac{E_{curr} + \Delta E}{N*M} \right) \right)$$

where N is the height of the image Y and M is the width of said image;

$Y_{i,j}$ are the values of the pixels of the image Y;

$Y'_{i,j}$ are the values of the pixels of an image Y' reconstructed from the epitome charts and the candidate region ΔE, the pixel value of the blocks not reconstructed being set to zero; and λ is a parameter.

5. The method according to claim 4, wherein λ is equal to 1000.

6. A device for extracting an epitome from an image Y divided into blocks to reconstruct said image from said extracted epitome comprising:

a hardware processor configured to:
- search, for each block, a set of patches in the image Y with similar content;
- determine, for each patch of said sets, the set of blocks able to be represented by said patch;
- construct, from said sets of blocks, epitome charts by initializing said epitome chart with one patch and extending said epitome chart with at least one region contained in a patch overlapping said epitome chart;
- wherein said region is selected by taking into account the blocks represented by said patch overlapping said epitome chart and by any other patch contained in said epitome chart enlarged by said selected region.

7. The device according to claim 6, wherein said epitome chart is initialized with one patch of said lists which is the most representative of the not yet represented blocks.

8. The device according to claim 6, wherein extending the epitome chart comprises:

- determining a set of candidate regions for extension of said epitome chart from patches overlapping said epitome chart and representing blocks not represented by the epitome chart;
- selecting one candidate region ΔE of said set of candidate regions by taking into account the blocks represented by the patch containing said candidate region and by any other patch contained in said epitome chart enlarged by said selected candidate region;
- adding said selected candidate region to said epitome chart;
- repeating said determining a set of candidate regions, selecting one region and adding the selected candidate region to the epitome chart until no more patches overlap said epitome chart.

9. The device according to claim 8, wherein selecting one candidate region of said set of candidate regions comprises determining the candidate region ΔE of said set of candidate regions minimizing the following function:

$$\left( \frac{\sum_{i}^{N} \sum_{j}^{M} (Y_{i,j} - Y'_{i,j})}{N*M} + \lambda * \left( \frac{E_{curr} + \Delta E}{N*M} \right) \right)$$

where N is the height of the image Y and M is the width of said image;

$Y_{i,j}$ are the values of the pixels of the image Y;

$Y'_{i,j}$ are the values of the pixels of an image Y' reconstructed from the epitome charts and the candidate region ΔE, the pixel value of the blocks not reconstructed being set to zero; and λ is a parameter.

10. The device according to claim 9, wherein h is equal to 1000.

* * * * *